(12) United States Patent
Mizushima et al.

(10) Patent No.: US 7,838,118 B2
(45) Date of Patent: *Nov. 23, 2010

(54) LIQUID SILICONE RUBBER COATING COMPOSITION, CURTAIN AIR BAG, AND METHOD OF PRODUCING SAME

(75) Inventors: Hidenori Mizushima, Annaka (JP);
Masayuki Ikeno, Maebashi (JP);
Shigeru Ubukata, Takasaki (JP);
Takashi Tanaka, Sakai (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 625 days.

This patent is subject to a terminal disclaimer.

(21) Appl. No.: 11/758,436

(22) Filed: Jun. 5, 2007

(65) Prior Publication Data
US 2007/0281564 A1 Dec. 6, 2007

(30) Foreign Application Priority Data
Jun. 6, 2006 (JP) .............................. 2006-156990

(51) Int. Cl.
*B32B 9/04* (2006.01)
(52) U.S. Cl. ..................... 428/447; 442/76; 280/728.1
(58) Field of Classification Search .................... 442/76; 428/447; 280/728.1
See application file for complete search history.

(56) References Cited

U.S. PATENT DOCUMENTS

| | | | |
|---|---|---|---|
| 5,789,084 A * | 8/1998 | Nakamura et al. | 428/447 |
| 5,877,256 A | 3/1999 | Nakamura et al. | |
| 6,387,520 B1 | 5/2002 | Fujiki et al. | |
| 7,534,499 B2 * | 5/2009 | Ikeno et al. | 428/447 |
| 2003/0211340 A1 | 11/2003 | Ikeno et al. | |
| 2005/0054762 A1 | 3/2005 | Yaginuma et al. | |
| 2005/0267257 A1 | 12/2005 | Mizushima et al. | |
| 2006/0159935 A1 | 7/2006 | Mizushima et al. | |
| 2006/0177673 A1 | 8/2006 | Ikeno et al. | |
| 2009/0001690 A1 * | 1/2009 | Ikeno et al. | 280/728.1 |

FOREIGN PATENT DOCUMENTS

| | | |
|---|---|---|
| EP | 0 764 702 A2 | 3/1997 |
| EP | 1 342 755 A2 | 9/2003 |
| EP | 1 681 326 A1 | 7/2006 |
| EP | 1 688 463 A1 | 8/2006 |
| EP | 1 792 943 A1 | 6/2007 |
| EP | 1 808 467 A2 | 7/2007 |
| JP | 2001-287610 | 10/2001 |
| JP | 2002-138249 | 5/2002 |
| JP | 2007-186596 | 7/2007 |

OTHER PUBLICATIONS

U.S. Appl. No. 11/617,904, filed Dec. 29, 2006, Ikeno, et al.
U.S. Appl. No. 12/181,682, filed Jul. 29, 2008, Ikeno, et al.
U.S. Appl. No. 12/044,446, filed Mar. 7, 2008, Ikeno, et al.

* cited by examiner

*Primary Examiner*—Lynda Salvatore
(74) *Attorney, Agent, or Firm*—Oblon, Spivak, McClelland, Maier & Neustadt, L.L.P.

(57) ABSTRACT

Provided is a liquid silicone rubber coating composition, including predetermined quantities of (A) an organopolysiloxane containing 2 or more Si atom-bonded alkenyl groups, (B) an organohydrogenpolysiloxane of a specific structure containing 2 or more SiH groups, (C) an addition reaction catalyst, (D) a finely powdered silica with a specific surface area of at least 50 $m^2/g$, (E) an organosilicon compound containing an epoxy group and a Si atom-bonded alkoxy group, and (F) a titanium compound and/or a zirconium compound. The coating composition exhibits excellent adhesion to an air bag base fabric and, therefore, is useful for producing a curtain air bag having a silicone rubber coating layer including a cured product of such a composition on at least one surface of the base fabric.

6 Claims, No Drawings

LIQUID SILICONE RUBBER COATING COMPOSITION, CURTAIN AIR BAG, AND METHOD OF PRODUCING SAME

BACKGROUND OF THE INVENTION

1. Field of the Invention

The present invention relates to a liquid silicone rubber coating composition that is ideal for producing air bags for vehicles and the like, wherein a film of a silicone rubber coating is formed on a fibrous fabric such as 6,6-nylon, 6-nylon or polyester, and is particularly suited to the production of curtain air bags, which unlike the air bags installed for the driver's seat and passenger seat, are housed along the edge of the roof from the front pillar, and must be capable of maintaining an inflated state for a certain period of time in order to protect the region around the head and prevent people being flung from the vehicle during a collision or rollover of the vehicle, and also relates to a curtain air bag having a silicone rubber coating layer comprising a cured product of such a composition, and a method of producing such an air bag.

2. Description of the Prior Art

Conventional air bag silicone rubber compositions used for forming a rubber coating on a fibrous surface, include the compositions described below. For example, patent reference 1 discloses a liquid silicone rubber coating composition for an air bag that exhibits excellent adhesion to base fabrics, prepared by adding an inorganic filler, an organopolysiloxane resin, and an epoxy group-containing organosilicon compound to an addition curable composition. Patent reference 2 discloses a liquid silicone rubber coating composition for an air bag that develops excellent adhesion to base fabrics upon heat curing for a short period, prepared by adding an inorganic filler, an organopolysiloxane resin, an organotitanium compound, and an alkyl silicate or alkyl polysilicate to an addition curable composition. Patent reference 3 discloses a silicone rubber coating composition for an air bag with excellent thin-film coating properties, in which the viscosity of a vinyl group-containing organopolysiloxane is restricted to not more than 8,000 centipoise. Patent reference 4 discloses a liquid silicone rubber composition for coating that is used in the production of a silicone rubber-coated base fabric with reduced tackiness, and is prepared by adding a wet silica with an average BET specific surface area within a range from 150 to 250 m$^2$/g and an average particle size of not more than 20 µm to a rubber coating composition.

However, when these compositions are used in curtain air bag applications, because all of the compositions suffer from inferior adhesion to the air bag base fabric, none of the compositions is able to satisfactorily suppress leakage of the inflator gas to enable the inflation time to be sustained for a satisfactory period.

[Patent Reference 1] U.S. Pat. No. 5,877,256
[Patent Reference 2] JP 2002-138249A
[Patent Reference 3] JP 2001-287610A
[Patent Reference 4] U.S. Pat. No. 6,387,520

SUMMARY OF THE INVENTION

The present invention takes the above circumstances into consideration, with an object of providing a liquid silicone rubber coating composition that exhibits excellent adhesion to an air bag base fabric, particularly when used for a curtain air bag application, and also provides a curtain air bag having a silicone rubber coating layer comprising a cured product of such a composition on at least one surface of the base fabric, and a method of producing such a curtain air bag.

As a result of intensive investigation aimed at achieving the above object, the inventors of the present invention discovered that when a liquid silicone rubber coating composition, comprising: (A) an organopolysiloxane containing 2 or more alkenyl groups bonded to silicon atoms within each molecule, (B) an organohydrogenpolysiloxane of a specific structure containing at least 2 hydrogen atoms bonded to silicon atoms within each molecule, (C) an addition reaction catalyst, preferably (D) a finely powdered silica with a specific surface area of at least 50 m$^2$/g, (E) an organosilicon compound containing an epoxy group and a silicon atom-bonded alkoxy group within each molecule, and (F) either one of, or both, a titanium compound and a zirconium compound was used for the silicone rubber coating layer of a curtain air bag, the coating layer exhibited excellent adhesion to the air bag base fabric, meaning leakage of the inflator gas could be suppressed, enabling inflation of the curtain air bag to be sustained for a satisfactory period, and they were therefore able to complete the present invention.

Accordingly, a first aspect of the present invention provides a liquid silicone rubber coating composition, comprising:

(A) 100 parts by mass of an organopolysiloxane containing 2 or more alkenyl groups bonded to silicon atoms within each molecule, (B) an organohydrogenpolysiloxane containing at least 2 hydrogen atoms bonded to silicon atoms within each molecule, represented by a general formula (1) shown below:

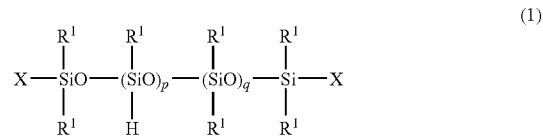

(wherein, R$^1$ represents mutually identical or different, unsubstituted or substituted monovalent hydrocarbon groups that contain no aliphatic unsaturated bonds, each X represents, independently, a hydrogen atom or R$^1$, p represents an integer from 1 to 50, and q represents an integer from 0 to 50, provided that a value of t, represented by a formula: t=p/(p+q) satisfies $0.2 \leq t \leq 1$, and when p is 1, at least one of the X groups represents a hydrogen atom), in sufficient quantity that the number of hydrogen atoms bonded to silicon atoms within the component (B) is within a range from 1 to 10 for each silicon atom-boned alkenyl group within the component (A), (C) an effective quantity of an addition reaction catalyst, (D) 0 to 50 parts by mass of a finely powdered silica with a specific surface area of at least 50 m 2/g, (E) 0.1 to 10 parts by mass of an organosilicon compound containing an epoxy group and a silicon atom-bonded alkoxy group within each molecule, and (F) 0.1 to 5 parts by mass of either one of, or both, a titanium compound and a zirconium compound.

A second aspect of the present invention provides a method of producing a curtain air bag, comprising the steps of: applying the above composition to at least one surface of a substrate comprising a fibrous fabric, and curing the composition, thereby forming a silicone rubber coating layer comprising a cured product of the composition on at least one surface of the substrate.

A third aspect of the present invention provides a curtain air bag comprising:

a substrate comprising a fibrous fabric and a silicone rubber coating layer comprising a cured product of the above composition, wherein the silicone rubber coating layer is formed on at least one surface of the substrate.

According to the present invention, a liquid silicone rubber coating composition that exhibits excellent adhesion to an air bag base fabric can be obtained. A curtain air bag having a silicone rubber coating layer comprising a cured product of the composition on at least one surface of the base fabric suppresses leakage of the inflator gas, thus enabling the inflation time to be sustained for a satisfactory period.

DETAILED DESCRIPTION OF THE PREFERRED EMBODIMENTS

As follows is a more detailed description of the present invention. In the present invention, viscosity values refer to values measured using a rotational viscometer.

<Liquid Silicone Rubber Coating Composition>

A liquid silicone rubber coating composition of the present invention comprises the components (A) through (F) described below, and is a liquid at room temperature (defined as 25° C., this also applies below). As follows is a detailed description of each of these components.

[Component (A)]

The organopolysiloxane of the component (A) contains 2 or more alkenyl groups bonded to silicon atoms within each molecule, and functions as the base polymer of the composition of the present invention. The organopolysiloxane of the component (A) may be either a single compound, or a combination of two or more different compounds.

There are no particular restrictions on the molecular structure of the component (A), and suitable structures include straight-chain, cyclic, and branched-chain structures, although a straight-chain diorganopolysiloxane in which the principal chain comprises essentially repeating diorganosiloxane units, and both molecular chain terminals are blocked with triorganosiloxy units is preferred (wherein, these organo groups may include an alkenyl group). Furthermore, in those cases where the molecular structure of the organopolysiloxane of the component (A) is either a straight chain or a branched chain, the positions within the organopolysiloxane molecule of the silicon atoms to which the alkenyl groups are bonded may be either one of, or both, the molecular chain terminals and positions within the molecular chain (namely, non-terminal positions). The component (A) is most preferably a straight-chain diorganopolysiloxane containing alkenyl groups bonded to at least the silicon atoms at both molecular chain terminals.

Examples of the alkenyl groups bonded to silicon atoms within the component (A) include, for example, mutually identical or different, unsubstituted or substituted alkenyl groups, typically containing from 2 to 8, and preferably from 2 to 4, carbon atoms. Specific examples include a vinyl group, allyl group, propenyl group, butenyl group, pentenyl group, hexenyl group, cyclohexenyl group or heptenyl group, and of these, a vinyl group is particularly preferred.

The quantity of alkenyl groups bonded to silicon atoms within the component (A), relative to the total number of monovalent organic groups bonded to silicon atoms, is preferably within a range from 0.001 to 10 mol %, and is even more preferably from 0.01 to 5 mol %.

Examples of the organic groups bonded to silicon atoms within the component (A) other than the above alkenyl groups include, for example, mutually identical or different, unsubstituted or substituted monovalent hydrocarbon groups, typically containing from 1 to 12, and preferably from 1 to 10, carbon atoms. Examples of monovalent hydrocarbon groups that have been substituted include halogen-substituted groups. Specific examples of these organic groups include alkyl groups such as a methyl group, ethyl group, propyl group, butyl group, pentyl group, hexyl group, cyclohexyl group or heptyl group; aryl groups such as a phenyl group, tolyl group, xylyl group or naphthyl group; aralkyl groups such as a benzyl group or phenethyl group; and halogenated alkyl groups such as a chloromethyl group, 3-chloropropyl group or 3,3,3-trifluoropropyl group, and of these, a methyl group or phenyl group is particularly preferred.

The viscosity at 25° C. of the component (A) is preferably within a range from 100 to 500,000 mPa·s, and is even more preferably within a range from 300 to 100,000 mPa·s. A viscosity value within this range yields more favorable handling for the resulting composition, as well as superior physical properties for the resulting silicone rubber.

Preferred examples of the component (A) include organopolysiloxanes represented by an average composition formula (2) shown below:

$$R_a SiO_{(4-a)/2} \qquad (2)$$

(wherein, R represents mutually identical or different, unsubstituted or substituted monovalent hydrocarbon groups of 1 to 10, and preferably 1 to 8, carbon atoms, and a represents a number within a range from 1.5 to 2.8, preferably from 1.8 to 2.5, and even more preferably from 1.95 to 2.05, provided that 0.001 to 10 mol %, and preferably from 0.01 to 5 mol % of all the R groups are alkenyl groups). Specific examples of the R groups include the alkenyl groups listed above as examples of the alkenyl groups bonded to silicon atoms within the component (A), and the organic groups listed above as examples of the organic groups bonded to silicon atoms within the component (A) other than the alkenyl groups.

Specific examples of the organopolysiloxane of the component (A) include copolymers of dimethylsiloxane and methylvinylsiloxane with both molecular chain terminals blocked with trimethylsiloxy groups, methylvinylpolysiloxane with both molecular chain terminals blocked with trimethylsiloxy groups, copolymers of dimethylsiloxane, methylvinylsiloxane and methylphenylsiloxane with both molecular chain terminals blocked with trimethylsiloxy groups, dimethylpolysiloxane with both molecular chain terminals blocked with dimethylvinylsiloxy groups, methylvinylpolysiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane, methylvinylsiloxane and methylphenylsiloxane with both molecular chain terminals blocked with dimethylvinylsiloxy groups, dimethylpolysiloxane with both molecular chain terminals blocked with divinylmethylsiloxy groups, copolymers of dimethylsiloxane and methylvinylsiloxane with both molecular chain terminals blocked with divinylmethylsiloxy groups, dimethylpolysiloxane with both molecular chain terminals blocked with trivinylsiloxy groups, copolymers of dimethylsiloxane and methylvinylsiloxane with both molecular chain terminals blocked with trivinylsiloxy groups, organosiloxane copolymers comprising siloxane units represented by the formula $R^2_3SiO_{0.5}$, siloxane units represented by the formula $R^2{}_2R^3SiO_{0.5}$, siloxane units represented by the formula $R^2{}_2SiO$, and siloxane units represented by the formula $SiO_2$, organosiloxane copolymers comprising siloxane units represented by the formula $R^2{}_3SiO_{0.5}$, siloxane units represented by the formula $R^2{}_2R^3SiO_{0.5}$, and siloxane units represented by the formula $SiO_2$, organosiloxane copolymers comprising siloxane units represented by the formula $R^2{}_2R^3SiO_{0.5}$, siloxane units represented by the formula $R^2{}_2SiO$, and siloxane units represented by the formula $SiO_2$, organosiloxane copolymers comprising siloxane units represented by the formula $R^2R^3SiO$, and siloxane units represented by the formula $R^2SiO_{1.5}$ or siloxane units represented by the formula $R^3SiO_{1.5}$, and mixtures of two or more of these organopolysiloxanes.

The groups $R^2$ within the above formulas represent identical or different, unsubstituted or substituted monovalent hydrocarbon groups other than alkenyl groups, and examples of suitable groups include alkyl groups such as a methyl group, ethyl group, propyl group, butyl group, pentyl group, hexyl group, cyclohexyl group or heptyl group; aryl groups such as a phenyl group, tolyl group, xylyl group or naphthyl group; aralkyl groups such as a benzyl group or phenethyl group; and halogenated alkyl groups such as a chloromethyl group, 3-chloropropyl group or 3,3,3-trifluoropropyl groups. Furthermore, the groups $R^3$ in the above formulas are alkenyl groups, and examples of suitable groups include a vinyl group, allyl group, butenyl group, pentenyl group, hexenyl group or heptenyl group.

[Component (B)]

The organohydrogenpolysiloxane of the component (B) is an essential component that functions as a cross-linking agent in which the silicon atom-bonded hydrogen atoms (namely, SiH groups) within the molecule undergo a hydrosilylation addition reaction with the alkenyl groups within the component (A), thereby forming cross-linked structures, causing curing, and generating a silicone rubber cured product that has adequate strength for practical purposes. The organohydrogenpolysiloxane is represented by the general formula (1) shown below.

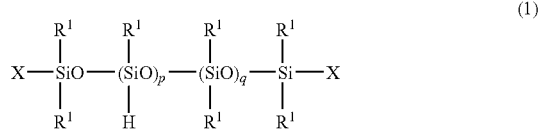

(1)

(wherein, $R^1$ represents mutually identical or different, unsubstituted or substituted monovalent hydrocarbon groups that contain no aliphatic unsaturated bonds, each X represents, independently, a hydrogen atom or $R^1$, p represents an integer from 1 to 50, and q represents an integer from 0 to 50, provided that a value of t, represented by a formula: $t=p/(p+q)$ satisfies $0.2 \leq t \leq 1$, and when p is 1, at least one of the X groups represents a hydrogen atom)

The groups $R^1$ in the above general formula (1) are mutually identical or different, unsubstituted or substituted monovalent hydrocarbon groups that contain no aliphatic unsaturated bonds, and typically contain from 1 to 12, and preferably from 1 to 8, carbon atoms. Specific examples of $R^1$ include alkyl groups such as a methyl group, ethyl group, propyl group, isopropyl group, butyl group, isobutyl group, tert-butyl group, hexyl group, octyl group or decyl group; aryl groups such as a phenyl group, tolyl group, xylyl group, or naphthyl group; cycloalkyl groups such as a cyclohexyl group; aralkyl groups such as a benzyl group or phenylethyl groups; halogen-substituted hydrocarbon groups such as a chloromethyl group, bromoethyl group, or trifluoropropyl groups; and cyano-substituted hydrocarbon groups such as a cyanoethyl group. Of these, in a similar manner to the component (A), a methyl group or phenyl group is particularly preferred. In the general formula (1), organohydrogenpolysiloxanes in which the $R^1$ groups are either all methyl groups or all phenyl groups, and organohydrogenpolysiloxanes in which a portion of the $R^1$ groups are methyl groups and the remainder are phenyl groups are readily synthesized and exhibit favorable chemical stability.

The value of p in the general formula (1) is an integer that typically falls within a range from 1 to 50, preferably from 2 to 25, even more preferably from 3 to 25, even more preferably from 5 to 20, and is most preferably from 10 to 20, whereas q is an integer that typically falls within a range from 0 to 50, preferably from 0 to 20, and even more preferably from 0 to 10, provided that t satisfies $0.2 \leq t \leq 1$, and preferably satisfies $0.5 \leq t \leq 1$, and that when p is 1, at least one of the X groups represents a hydrogen atom.

Specific examples of the organohydrogenpolysiloxane of the component (B) include those methylhydrogenpolysiloxanes with both terminals blocked with trimethylsiloxy groups, copolymers of dimethylsiloxane and methylhydrogensiloxane with both terminals blocked with trimethylsiloxy groups, methylhydrogenpolysiloxanes with both terminals blocked with dimethylhydrogensiloxy groups, copolymers of dimethylsiloxane and methylhydrogensiloxane with both terminals blocked with dimethylhydrogensiloxy groups, copolymers of methylhydrogensiloxane and diphenylsiloxane with both terminals blocked with trimethylsiloxy groups, copolymers of methylhydrogensiloxane, diphenylsiloxane and dimethylsiloxane with both terminals blocked with trimethylsiloxy groups, copolymers of methylhydrogensiloxane and methylphenylsiloxane with both terminals blocked with trimethylsiloxy groups, copolymers of methylhydrogensiloxane, methylphenylsiloxane and dimethylsiloxane with both terminals blocked with trimethylsiloxy groups, copolymers of methylhydrogensiloxane and diphenylsiloxane with both terminals blocked with dimethylhydrogensiloxy groups, copolymers of methylhydrogensiloxane and methylphenylsiloxane with both terminals blocked with dimethylhydrogensiloxy groups, copolymers of methylhydrogensiloxane, dimethylsiloxane and diphenylsiloxane with both terminals blocked with dimethylhydrogensiloxy groups, and copolymers of methylhydrogensiloxane, dimethylsiloxane and methylphenylsiloxane with both terminals blocked with dimethylhydrogensiloxy groups that satisfy the conditions of the aforementioned general formula (1).

In the present invention, the organohydrogenpolysiloxane represented by the above general formula (1) may be either a single compound, or a combination of two or more different compounds.

The viscosity at 25° C. of the organohydrogenpolysiloxane represented by the above general formula (1) is preferably within a range from 1 to 500 mPa·sec, and is even more preferably from 5 to 100 mPa·sec.

The blend quantity of the component (B) is set so that the number of silicon atom-bonded hydrogen atoms within the component (B) for each silicon atom-bonded alkenyl group within the component (A) is typically within a range from 1 to 10 atoms, and preferably from 1 to 7 atoms. If this blend quantity is such that the number of silicon atom-bonded hydrogen atoms within the component (B) for each silicon atom-bonded alkenyl group within the component (A) is less than 1 atom, then the curing of the obtained composition tends to be unsatisfactory. Furthermore, if the blend quantity is such that the number of silicon atom-bonded hydrogen atoms within the component (B) for each silicon atom-bonded alkenyl group within the component (A) exceeds 10 atoms, then the heat resistance of the product silicone rubber tends to deteriorate markedly.

In the composition of the present invention, an organohydrogenpolysiloxane other than the component (B) and the component (E) described below may be added as an optional component, but in such cases, the total number of SiH groups contained within the component (B), the component (E) and the organohydrogenpolysiloxane other than the component (B) and the component (E) must fall within a range from 1 to 10 atoms, and preferably from 1 to 7 atoms, for each silicon atom-bonded alkenyl group within the component (A), and the molar ratio of SiH groups within the component (B) relative to the total of all SiH groups is typically within a range from 0.5 to 1, and preferably from 0.7 to 1.

[Component (C)]

The addition reaction catalyst of the component (C) may be any catalyst that is capable of promoting the hydrosilylation addition reaction between the silicon atom-bonded alkenyl groups within the component (A) and the SiH groups within the component (B). The component (C) may use either a single catalyst, or a combination of two or more different catalysts. Suitable examples of the component (C) include platinum-group metals such as platinum, palladium, and rhodium, chloroplatinic acid, alcohol-modified chloroplatinic acid, coordination compounds of chloroplatinic acid with olefins, vinylsiloxane, or acetylene compounds, and platinum-group metal compounds such as tetrakis(triphenylphosphine)palladium and chlorotris(triphenylphosphine)rhodium, although of these, platinum compounds are preferred.

The blend quantity of the component (C) need only be sufficient to be effective as an addition reaction catalyst, and a preferred quantity, calculated as the mass of the catalytic metal element relative to the combined mass of the components (A) and (B), is within a range from 1 to 500 ppm, with quantities from 10 to 100 ppm being particularly desirable. Provided the blend quantity falls within this range, the addition reaction can be satisfactorily accelerated, curing occurs favorable, and the rate of the addition reaction can be increased easily by increasing the blend quantity of the catalyst, which is desirable from an economic viewpoint.

[Component (D)]

The finely powdered silica of the component (D), which is used as an optional component in the present invention when required, functions as a reinforcing agent. In other words, the component (D) imparts a high tear strength to the cured product of the composition of the present invention. Accordingly, by using the finely powdered silica of the component (D) as a reinforcing agent, a coating film with superior tear strength properties can be formed. The finely powdered silica of the component (D) typically has a specific surface area of at least 50 m$^2$/g, and this value is preferably within a range from 50 to 400 m$^2$/g, and even more preferably from 100 to 300 m$^2$/g. Provided the specific surface area falls within this range, superior tear strength properties can be imparted to the cured product. The specific surface area is measured using the BET method. The component (D) may use either a single material, or a combination of two or more different materials.

Provided the specific surface area falls within the range specified above, the finely powdered silica of the component (D) can employ known silica materials conventionally used as reinforcing fillers within silicone rubbers, including fumed silica and precipitated silica.

These finely powdered silica materials may be used as is, although in order to impart a superior level of flowability to the composition of the present invention, are preferably used in the form of a hydrophobic finely powdered silica, wherein the surface of the silica has undergone hydrophobic treatment with an organosilicon compound, including a methylchlorosilane such as trimethylchlorosilane, dimethyldichlorosilane, or methyltrichlorosilane; a dimethylpolysiloxane; or a hexaorganodisilazane such as hexamethyldisilazane, divinyltetramethyldisilazane, or dimethyltetravinyldisilazane.

The blend quantity of the component (D) must be not more than 50 parts by mass (namely, from 0 to 50 parts by mass) per 100 parts by mass of the organopolysiloxane of the component (A). If the blend quantity exceeds 50 parts by mass, then the flowability of the composition may deteriorate, causing a worsening of the coating workability. The blend quantity is preferably within a range from 0.1 to 50 parts by mass, even more preferably from 1 to 50 parts by mass, and is most preferably from 5 to 40 parts by mass. If the blend quantity falls within this range, then a particularly favorable tear strength can be more readily imparted to the cured product of the composition of the present invention.

[Component (E)]

The component (E) may use any organosilicon compound, provided the compound contains an epoxy group and a silicon atom-bonded alkoxy group within each molecule, although from the viewpoint of achieving superior adhesion, an organosilicon compound containing at least 1 epoxy group and at least 2 silicon atom-bonded alkoxy groups, such as a silane, or cyclic or straight-chain siloxane containing from 2 to 30, and preferably from 4 to 20 silicon atoms, containing at least 1 epoxy group and at least 2 silicon atom-bonded alkoxy groups is particularly preferred. The component (E) may use either a single compound, or a combination of two or more different compounds.

The epoxy group is preferably bonded to a silicon atom in the form of a glycidoxyalkyl group such as a glycidoxypropyl group; or an epoxy group-containing cyclohexylalkyl group such as a 2,3-epoxycyclohexylethyl group or 3,4-epoxycyclohexylethyl group. The silicon atom-bonded alkoxy group is bonded to a silicon atom, and preferably forms a trialkoxysilyl group such as a trimethoxysilyl group or triethoxysilyl group; or an alkyldialkoxysilyl group such as a methyldimethoxysilyl group, ethyldimethoxysilyl group, methyldiethoxysilyl group, or ethyldiethoxysilyl group.

Furthermore, besides the epoxy group and silicon atom-bonded alkoxy group within each molecule, the component (E) may also include other functional groups, including at least one functional group selected from the group consisting of alkenyl groups such as a vinyl group, a (meth)acryloxy group, and a hydrosilyl group (SiH group).

Examples of the organosilicon compound of the component (E) include the organosilicon compounds represented by chemical formulas shown below, mixtures of 2 or more of these compounds, and partial hydrolysis-condensation products of one or more of these compounds.

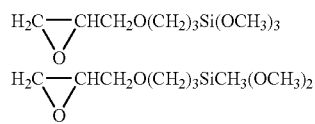

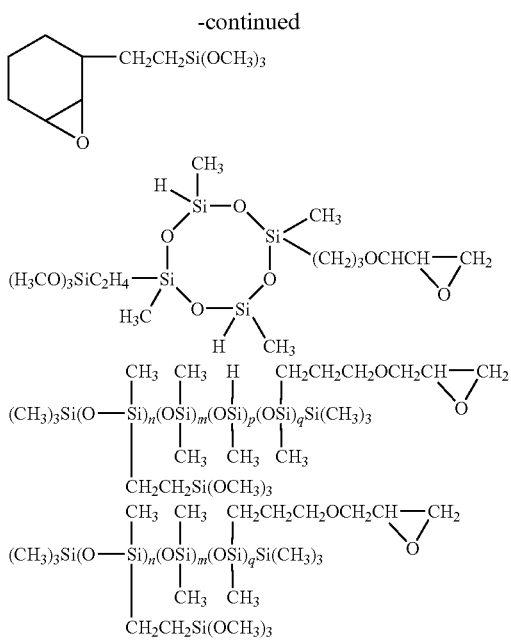

(wherein, n is an integer from 1 to 10, m is an integer from 0 to 100, and preferably an integer from 0 to 20, p is an integer from 1 to 100, and preferably an integer from 1 to 20, and q is an integer from 1 to 10)

The blend quantity of the component (E) is typically within a range from 0.1 to 10 parts by mass, and preferably from 0.5 to 5 parts by mass, per 100 parts by mass of the organopolysiloxane of the component (A). If this blend quantity is less than 0.1 parts by mass, then the resulting composition may not exhibit adequate adhesive strength. If the blend quantity exceeds 10 parts by mass, then further increases in the blend quantity are unlikely to yield further improvements in the adhesive strength of the resulting composition, and the increased costs tend to make the composition uneconomic.

[Component (F)]

The component (F) is either one of, or both, a titanium compound (and particularly an organotitanium compound) and a zirconium compound (and particularly an organozirconium compound), and functions as a condensation-assisting catalyst for promoting adhesion. The component (F) may use either a single compound, or a combination of two or more different compounds. Examples of the component (F) include titanium-based condensation-assisting catalysts including organotitanate esters such as titanium tetraisopropoxide, titanium tetra-normal-butoxide and titanium tetra-2-ethylhexoxide, and organotitanium chelate compounds such as titanium diisopropoxybis(acetylacetonate), titanium diisopropoxybis (ethylacetoacetate) and titanium tetraacetylacetonate, and zirconium-based condensation-assisting catalysts including organozirconium esters such as zirconium tetra-normal-propoxide and zirconium tetra-normal-butoxide, and organozirconium chelate compounds such as zirconium tributoxy monoacetylacetonate, zirconium monobutoxy acetylacetonate bis(ethylacetoacetate), and zirconium tetraacetylacetonate.

The blend quantity of the component (F) is typically within a range from 0.1 to 5 parts by mass, and preferably from 0.2 to 2 parts by mass, per 100 parts by mass of the component (A). If the blend quantity is less than 0.1 parts by mass, then the resulting cured product tends to exhibit inferior adhesive durability under high-temperature, high-humidity conditions. If the blend quantity exceeds 5 parts by mass, then the heat resistance of the obtained cured product tends to deteriorate.

[Other Components]

In addition to the components (A) through (F) described above, other optional components can also be added to the composition of the present invention, provided such addition does not impair the object of the present invention. Specific examples of these other components include those described below. These other components can be used either alone, or in combinations of two or more different materials.

Reaction Retarders

A reaction retarder may be any compound that exhibits a suppression effect on the curing reaction promoted by the addition reaction catalyst of the aforementioned component (C), and conventional reaction retarders can be used. Specific examples of suitable retarders include phosphorus-containing compounds such as triphenylphosphine; nitrogen-containing compounds such as tributylamine, tetramethylethylenediamine, and benzotriazole; sulfur-containing compounds; acetylene-based compounds such as acetylene alcohols; compounds that contain two or more alkenyl groups; hydroperoxy compounds; and maleic acid derivatives.

The size of the curing suppression effect provided by the reaction retarder varies depending on the chemical structure of the reaction retarder, and consequently the quantity added of the reaction retarder is preferably adjusted to the most appropriate quantity for the particular reaction retarder being used. By using the most appropriate quantity of the reaction retarder, a composition with superior long term storage stability at room temperature and superior curability can be obtained.

Inorganic Fillers

Examples of suitable inorganic fillers include inorganic fillers such as crystalline silica, hollow fillers, silsesquioxanes, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fiber; fillers in which the above types of inorganic fillers have undergone hydrophobic surface treatment with an organosilicon compound such as an organoalkoxysilane compound, organochlorosilane compound, organosilazane compound, or low molecular weight siloxane compound; silicone rubber powders; and silicone resin powders.

Other components

Examples of other components include, for example, organopolysiloxanes containing one silicon atom-bonded hydrogen atom within each molecule, but containing no other functional groups, organopolysiloxanes containing one silicon atom-bonded alkenyl group within each molecule, but containing no other functional groups, non-functional organopolysiloxanes containing no silicon atom-bonded hydrogen atoms, no silicon atom-bonded alkenyl groups, and no other functional groups, as well as organic solvents, creep hardening prevention agents, plasticizers, thixotropic imparting agents, pigments, dyes, and mold proofing agents.

[Method of Preparation]

The liquid silicone rubber coating composition of the present invention can be prepared by mixing the above components together in accordance with normal methods.

[Air Bags]

A liquid silicone rubber coating composition obtained in this manner exhibits excellent adhesion to the base fabric used for air bags, and is consequently particularly suited to the production of curtain air bags, which are housed along the edge of the roof from the front pillar, and must be capable of maintaining an inflated state for a certain period of time in order to protect the region around the head and prevent people being flung from the vehicle during a collision or rollover of the vehicle.

In the present invention, examples of the air bags, and particularly curtain air bags, on which a silicone rubber coating layer comprising a cured product of the above composition is formed include air bags of conventional construction, and specific examples include air bags in which a woven fabric of any of various synthetic fibers such as 6,6-nylon, 6-nylon, polyester fiber, aramid fiber, any of the various polyamide fibers, or any of the various polyester fibers is used as the base fabric, two sheets of this plain base fabric that have been rubber-coated on the inside surfaces are bonded together with an adhesive around their respective peripheries, and the adhesive layer is then stitched (hereafter referred to as plain fabric air bags), and woven air bags in which an aforementioned woven fabric is used as the base fabric, and the bag portion is formed by weaving.

The silicone rubber coating layer can be formed by applying the aforementioned liquid silicone rubber coating composition to at least one surface of, and preferably to only one surface of, the substrate comprising a fibrous fabric, and then conducting curing by, for example, performing heating inside a hot air dying oven. The silicone rubber-coated base fabric for a curtain air bag obtained in this manner can then be used to produce a curtain air bag.

Examples of the substrate comprising a fibrous fabric include substrates that use any of the aforementioned synthetic fiber woven fabrics as a base fabric. Furthermore, conventional methods can be adopted as the method for coating the above composition onto this substrate, and the thickness of the coating layer (or the quantity of the composition applied to the surface) is preferably within a range from 10 to 150 g/m$^2$, even more preferably from 15 to 80 g/m$^2$, and is most preferably from 20 to 60 g/m$^2$.

The coating composition of the present invention can be cured under conventional curing conditions using conventional curing methods. Specifically, the composition can be cured, for example, by heating at a temperature of 120 to 180° C. for a period of 1 to 10 minutes.

EXAMPLES

As follows is a more detailed description of the present invention that presents a series of examples and comparative examples, although the present invention is in no way limited by the examples presented below.

Example 1

65 parts by mass of a dimethylpolysiloxane with a viscosity at 25° C. of approximately 30,000 mPa·s and with both molecular chain terminals blocked with vinyldimethylsiloxy groups, 8 parts by mass of hexamethyldisiloxane, 2 parts by mass of water, and 40 parts by mass of a fumed silica with a specific surface area determined by the BET method of approximately 300 m$^2$/g (product name: Aerosil (a registered trademark) 300, manufactured by Nippon Aerosil Co., Ltd.) were placed in a kneader and mixed together for one hour at room temperature, yielding a mixture. Subsequently, the mixture was heated to 150° C., and mixing was continued for a further two hours. Following subsequent cooling of the mixture to room temperature, 19 parts by mass of the dimethylpolysiloxane with a viscosity at 25° C. of approximately 30,000 mPa·s and with both molecular chain terminals blocked with vinyldimethylsiloxy groups, and 5 parts by mass of a dimethylpolysiloxane with a viscosity at 25° C. of approximately 700 mPa·s, containing 5 mol % of vinylmethylsiloxy units relative to the total of the all diorganosiloxane units within the molecular main chain and with both molecular chain terminals blocked with trimethylsiloxy groups were added, and mixing was continued until a uniform mixture was obtained, thus yielding a base compound (I).

To 64 parts by mass of this base compound (I) were added and mixed 31 parts by mass of the dimethylpolysiloxane with a viscosity at 25° C. of approximately 30,000 mPa·s and with both molecular chain terminals blocked with vinyldimethylsiloxy groups, 35 parts by mass of a dimethylpolysiloxane with a viscosity at 25° C. of approximately 100,000 mPa·s and with both molecular chain terminals blocked with vinyldimethylsiloxy groups, 1.65 parts by mass of a methylhydrogenpolysiloxane with a viscosity at 25° C. of 5 mPa·s, containing silicon atom-bonded hydrogen atoms as molecular side chains and with both molecular chain terminals blocked with trimethylsiloxy groups (silicon atom-bonded hydrogen atom content=1.28% by mass, t=1), 0.07 parts by mass of 1-ethynylcyclohexanol, 0.25 parts by mass of a dimethylpolysiloxane solution of a complex of chloroplatinic acid and 1,3-divinyltetramethyldisiloxane containing a platinum atom content of 1% by mass, 0.65 parts by mass of γ-glycidoxypropyltrimethoxysilane, and 0.85 parts by mass of zirconium tetraacetylacetonate, thus completing preparation of a composition A.

<Hardness, Elongation at Rupture, Tensile Strength, and Tear Strength>

The composition A was pre-cured by heating at 150° C. for 5 minutes, and then post-cured at 150° C. for 1 hour to prepare a test sheet in accordance with JIS K 6249, and this sheet was measured for hardness, elongation at rupture, tensile strength and tear strength in accordance with JIS K 6249. The results are shown in Table 1.

<Peel Adhesive Strength>

The composition A was coated uniformly (60 g/m$^2$), with no irregularities, onto a 6,6-nylon base fabric used in air bags, and the composition was then cured by heating for 1 minute in a 170° C. oven, thus yielding a silicone rubber-coated nylon base fabric. The peel strength of the silicone rubber coating layer from the nylon base fabric was measured in the manner described below. Namely, two sheets of the silicone rubber-coated nylon base fabric of width 50 mm were bonded together using a 0.6 mm thick layer of an addition curing-type room temperature curable silicone adhesive X-32-2600 A/B, and the resulting structure was then allowed to stand at 23° C. for 24 hours to cure the adhesive. Subsequently, the two bonded sheets of silicone rubber-coated nylon base fabric were cut into segments of width 20 mm, and a T-type peel test was then conducted on each segment at a pull speed of 200 mm/minute. The results are shown in Table 1.

<Scott Flexing Test>

A Scott flexing test was conducted using a Scott flexing test device. The silicone rubber-coated nylon base fabric described above was subjected to 200 flexions using an applied pressure of 5 kgf, the degree of destruction of the coating portion was ascertained visually, and those cases in which the silicone rubber coating layer had not separated from the coated surface were deemed to have passed the test, whereas cases in which separation had occurred were deemed failures. The results are shown in Table 1.

Reference Example 1

To 78 parts by mass of the base compound (I) obtained in the example 1 were added and mixed 35 parts by mass of a dimethylpolysiloxane with a viscosity at 25° C. of approximately 5,000 mPa·s and with both molecular chain terminals blocked with vinyldimethylsiloxy groups, 15 parts by mass of a dimethylpolysiloxane with a viscosity at 25° C. of approximately 1,000 mPa·s, 10 parts by mass of an organopolysiloxane resin consisting of 39.5 mol % of $(CH_3)_3SiO_{1/2}$ units, 6.5 mol % of $(CH_3)_2(CH_2=CH)SiO_{1/2}$ units and 54 mol % of $SiO_2$ units, 6.4 parts by mass of a copolymer of dimethylsiloxane and methylhydrogensiloxane with a viscosity at 25° C. of 45 mPa·s, containing silicon atom-bonded hydrogen atoms as molecular side chains and with both molecular chain terminals blocked with trimethylsiloxy groups (silicon atom-bonded hydrogen atom content=1.08% by mass, t=0.7), 0.09 parts by mass of 1-ethynylcyclohexanol, 0.38 parts by mass of a dimethylpolysiloxane solution of a complex of chloroplatinic acid and 1,3-divinyltetramethyldisiloxane containing a platinum atom content of 1% by mass, 0.3 parts by mass of γ-glycidoxypropyltrimethoxysilane, and 0.2 parts by mass of titanium tetra-2-ethylhexoxide, thus completing preparation of a composition B.

The cured product of the composition B was measured for hardness, elongation at rupture, tensile strength, tear strength and peel adhesive strength, and also subjected to a Scott flexing test, in the same manner as the example 1. The results are shown in Table 1.

Comparative Example 1

With the exception of not using the zirconium tetraacetylacetonate used in the example 1, a composition C was prepared in the same manner as the example 1. The cured product of the composition C was measured for hardness, elongation at rupture, tensile strength, tear strength and peel adhesive strength, and also subjected to a Scott flexing test, in the same manner as the example 1. The results are shown in Table 1.

Comparative Example 2

With the exception of replacing the 1.65 parts by mass of the methylhydrogenpolysiloxane with a viscosity at 25° C. of 5 mPa·s, containing silicon atom-bonded hydrogen atoms as molecular side chains and with both molecular chain terminals blocked with trimethylsiloxy groups (silicon atom-bonded hydrogen atom content=1.28% by mass, t=1) from the example 1 with 7.75 parts by mass of a copolymer of dimethylsiloxane and methylhydrogensiloxane with a viscosity at 25° C. of 10 mPa·s, containing silicon atom-bonded hydrogen atoms as molecular side chains and with both molecular chain terminals blocked with trimethylsiloxy groups (silicon atom-bonded hydrogen atom content=0.15% by mass, t=0.1), a composition D was prepared in the same manner as the example 1. The cured product of the composition D was measured for hardness, elongation at rupture, tensile strength, tear strength and peel adhesive strength, and also subjected to a Scott flexing test, in the same manner as the example 1. The results are shown in Table 1.

Comparative Example 3

With the exception of replacing the 6.4 parts by mass of a copolymer of dimethylsiloxane and methylhydrogensiloxane with a viscosity at 25° C. of 45 mPa·s, containing silicon atom-bonded hydrogen atoms as molecular side chains and with both molecular chain terminals blocked with trimethylsiloxy groups (silicon atom-bonded hydrogen atom content=1.08% by mass, t=0.7) from the example 2 with 11.00 parts by mass of a copolymer of dimethylsiloxane and methylhydrogensiloxane with a viscosity at 25° C. of 10 mPa·s, containing silicon atom-bonded hydrogen atoms as molecular side chains and with both molecular chain terminals blocked with trimethylsiloxy groups (silicon atom-bonded hydrogen atom content=0.15% by mass, t=0.1), a composition E was prepared in the same manner as the example 2. The cured product of the composition E was measured for hardness, elongation at rupture, tensile strength, tear strength and peel adhesive strength, and also subjected to a Scott flexing test, in the same manner as the example 1. The results are shown in Table 1.

TABLE 1

|  | Example 1 | Reference Example 1 | Comparative example 1 | Comparative example 2 | Comparative example 3 |
| --- | --- | --- | --- | --- | --- |
| Hardness: Durometer type A | 26 | 47 | 26 | 25 | 43 |
| Elongation at rupture (%) | 650 | 330 | 650 | 700 | 400 |
| Tensile strength (MPa) | 4.1 | 5.5 | 4.1 | 3.5 | 5.0 |
| Tear strength (kN/m) | 15 | 20 | 15 | 10 | 15 |
| Peel adhesive strength (N/cm) | 50 | 45 | 20 | 20 | 15 |
| Scott flexing test | Pass | Pass | Fail | Fail | Fail |

What is claimed is:

1. A liquid silicone rubber coating composition, comprising:
   (A) 100 parts by mass of an organopolysiloxane containing 2 or more alkenyl groups bonded to silicon atoms within each molecule,
   (B) an organohydrogenpolysiloxane containing at least 2 hydrogen atoms bonded to silicon atoms within each molecule, represented by a general formula (1) shown below:

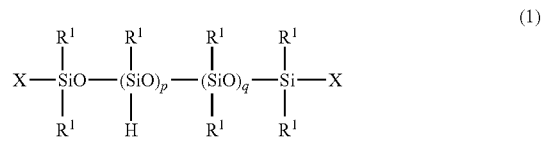

(1)

wherein, $R^1$ represents mutually identical or different, unsubstituted or substituted monovalent hydrocarbon groups that contain no aliphatic unsaturated bonds, each X represents, independently, a hydrogen atom or $R^1$, p represents an integer from 1 to 50, and q represents an integer from 0 to 50, provided that a value of t, represented by a formula: t=p/(p+q) satisfies 0.2≦t≦1, and when p is 1, at least one of said X groups represents a hydrogen atom, in sufficient quantity that a number of hydrogen atoms bonded to silicon atoms within said component (B) is within a range from 1 to 10 for each silicon atom-bonded alkenyl group within said component (A), (C) an effective quantity of an addition reaction catalyst, (D) 0 to 50 parts by mass of a finely powdered silica with a specific surface area of at least 50 m²/g, (E) 0.1 to 10 parts by mass of an organosilicon compound containing an epoxy group and a silicon atom-bonded alkoxy group within each molecule, and (F) 0.1 to 5 parts by mass of an organozirconium compound.

2. The composition according to claim 1, wherein said organozirconium compound is an organozirconium ester, an organozirconium chelate compound, or a combination thereof 3. A method of producing a curtain air bag, comprising the steps of:

applying a liquid silicone rubber coating composition, comprising:

(A) 100 parts by mass of an organopolysiloxane containing 2 or more alkenyl groups bonded to silicon atoms within each molecule, (B) an organohydrogenpolysiloxane containing at least 2 hydrogen atoms bonded to silicon atoms within each molecule, represented by a general formula (1) shown below:

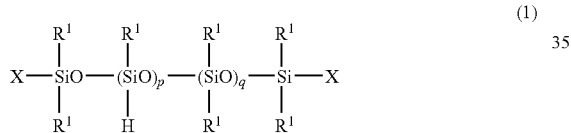

wherein, $R^1$ represents mutually identical or different, unsubstituted or substituted monovalent hydrocarbon groups that contain no aliphatic unsaturated bonds, each X represents, independently, a hydrogen atom or $R^1$, p represents an integer from 1 to 50, and q represents an integer from 0 to 50, provided that a value of t, represented by a formula: t=p/(p+q) satisfies 0.2≦t≦1, and when p is 1, at least one of said X groups represents a hydrogen atom, in sufficient quantity that a number of hydrogen atoms bonded to silicon atoms within said component (B) is within a range from 1 to 10 for each silicon atom-bonded alkenyl group within said component (A), (C) an effective quantity of an addition reaction catalyst, (D) 0 to 50 parts by mass of a finely powdered silica with a specific surface area of at least 50 m²/g, (E) 0.1 to 10 parts by mass of an organosilicon compound containing an epoxy group and a silicon atom-bonded alkoxy group within each molecule, and (F) 0.1 to 5 parts by mass of an organozirconium compound to at least one surface of a substrate comprising a fibrous fabric, and curing said composition, thereby forming a silicone rubber coating layer comprising a cured product of said composition on at least one surface of said substrate.

4. The method according to claim 3, wherein said organozirconium compound is an organozirconium ester, an organozirconium chelate compound, or a combination thereof.

5. A curtain air bag comprising:

a substrate comprising a fibrous fabric and a silicone rubber coating layer comprising a cured product of a liquid silicone rubber coating composition, comprising:

(A) 100 parts by mass of an organopolysiloxane containing 2 or more alkenyl groups bonded to silicon atoms within each molecule, (B) an organohydrogenpolysiloxane containing at least 2 hydrogen atoms bonded to silicon atoms within each molecule, represented by a general formula (1) shown below:

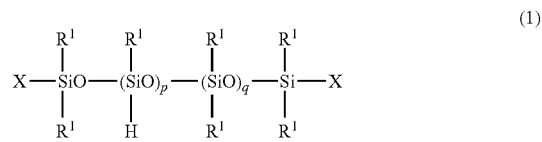

wherein, $R^1$ represents mutually identical or different, unsubstituted or substituted monovalent hydrocarbon groups that contain no aliphatic unsaturated bonds, each X represents, independently, a hydrogen atom or $R^1$, p represents an integer from 1 to 50, and q represents an integer from 0 to 50, provided that a value of t, represented by a formula: t=p/(p+q) satisfies 0.2≦t≦1, and when p is 1, at least one of said X groups represents a hydrogen atom, in sufficient quantity that a number of hydrogen atoms bonded to silicon atoms within said component (B) is within a range from 1 to 10 for each silicon atom-bonded alkenyl group within said component (A), (C) an effective quantity of an addition reaction catalyst, (D) 0 to 50 parts by mass of a finely powdered silica with a specific surface area of at least 50 m²/g, (E) 0.1 to 10 parts by mass of an organosilicon compound containing an epoxy group and a silicon atom-bonded alkoxy group within each molecule, and (F) 0.1 to 5 parts by mass of an organozirconium compound, wherein said silicone rubber coating layer is formed on at least one surface of said substrate.

6. The curtain air bag according to claim 5, wherein said organozirconium compound is an organozirconium ester, an organozirconium chelate compound, or a combination thereof.

* * * * *